July 28, 1959  R. MUNGEN  2,896,745
SEPARATION OF SOLIDS FROM GASES
Filed July 1, 1957  2 Sheets-Sheet 1

INVENTOR.
RICHARD MUNGEN
BY
ATTORNEY

July 28, 1959 R. MUNGEN 2,896,745
SEPARATION OF SOLIDS FROM GASES
Filed July 1, 1957 2 Sheets-Sheet 2

INVENTOR.
RICHARD MUNGEN
BY *Arthur McElroy*
ATTORNEY

United States Patent Office 2,896,745
Patented July 28, 1959

2,896,745

SEPARATION OF SOLIDS FROM GASES

Richard Mungen, Tulsa, Okla., assignor to Pan American Petroleum Corporation, Tulsa, Okla., a corporation of Delaware Application July 1, 1957, Serial No. 668,986

5 Claims. (Cl. 183—122)

The present invention relates to a novel method for recovering finely divided solids from gases. More particularly it is concerned with the separation of such solids by means of a porous filter medium and to a method for maintaining such medium in operating condition.

The use of a porous medium, for example, porous metal filters, to remove particles from gases, is well known. These filters have very fine pore openings ranging, for example, from about 0.0002 to about 0.0065 inch. During use, these filters become plugged. It is then necessary to reverse the gas flow through the filter system to dislodge the small catalyst particles from the pores of the filter element. This operation is generally referred to as the "blow-back cycle." Usually there is a series of these filter elements, each one of which is hooked up so that it can undergo a blow-back cycle independently of the other elements which may simultaneously be filtering the particles from the product gases, as described herein. The use of blow-back, however, has not been entirely satisfactory for reconditioning the filter elements since proper blow-back is difficult to obtain and since too high a blow-back rate impairs the effectiveness of the subsequent filtration step.

Removal of finely divided particles from gases is a procedure carried out in numerous industrial operations. Examples of a few of these are the cleaning of hot gases and fumes such as exist in open-hearth stacks, the removal of fly-ash from gas produced in the gasification of coal, and the separation of finely divided catalyst particles from product gases formed in the fluidized catalytic cracking of gas oil or in the synthesis of hydrocarbons.

Thus, in fluidized catalytic hydroforming of naphthas using expensive metals such as platinum or palladium supported on alumina, the problem of separating solids from gases is particularly important. In spite of the fact that the catalyst is maintained in a dense phase fluidized bed in such an operation, a certain amount of catalyst fines is present in the gaseous product stream taken overhead. These fines must be separated in order to conserve catalyst and/or to maintain product quality.

In the synthesis of hydrocarbons from carbon monoxide and hydrogen in a fluidized bed of catalyst, the problem of catalyst fines removal from the product gases is likewise important, although for reasons primarily different from those just mentioned. In carrying out this synthesis on an industrial scale, it was found that during separation of the catalyst from the product gases a cake or layer of catalyst, free carbon, and high boiling waxes formed over the surface of and between the filter elements, which could not be removed on blow-back. The spaces between the filter elements were completely filled. The catalyst fines covering the surface of the filter elements and filling the space between them, are extremely small. In one instance it was found that about 85 percent of such material was from 1 to 10 microns in diameter. Catalyst of this particle size, even in the absence of synthesis products and free carbon, is quite sticky and readily adheres to the filter element surfaces. This deposit or cake on the filter element surface can be partially removed by vibration of the element and completely removed by brushing the surface of each element with a stiff bristled brush. This procedure, however, is obviously time-consuming and impractical, particularly where continuous operation over extended periods of time is desired.

Accordingly, it is an object of my invention to provide a method for preventing the aforesaid layer or cake from accumulating on the surface of porous metal or similar filter elements when carrying out processes in which it is desirable to separate finely divided solids from gases.

Briefly, my invention embodies the concept of effecting a filtering operation involving gas-solids separation wherein the porous filter elements are at least partially submerged in a fluidized bed of particles substantially larger in size than the pores of the filter element. The particles in such a fluid bed may be of the same or different composition from the entrained particles desired to be separated from the gas. The size of these coarser particles may vary widely and is limited only by the fact that they should be capable of good fluidization performance. For example, a group of porous filters enclosed in a suitable case, may be immersed in a fluidized bed of relatively coarse particles having a diameter ranging from about $-16$ to $+325$ mesh, or preferably from $-40$ to $+200$ mesh. On forward flow, i.e., the production cycle, product gas bubbles flow up through the fluid bed toward the wall of the filter element. Part of the fine particles in the product gas are trapped by the mass of coarser fluidized material while some of the fines reach the filter element wall. Movement of the coarse particles in the fluid bed is slight since product gas bubbles rise upwardly around the walls of the fluid elements and pass into the interior of the filters all along the length thereof. Flow of gas into the filter elements, of course, depends on the manner in which fines are deposited on the filter surface. The movement of the top of the fluid bed is slight. Forward flow of gas through the filter case is continued until a substantial pressure drop is created, e.g., 0.5 to 50 p.s.i.

On blow-back the gas flow is reversed and fines are removed from the top of the filter case through a suitable vent. The velocity of the blow-back gas depends on the geometry of the unit, but in any event is sufficiently great to effect a classification of coarse and fine particles in the bed and subsequent removal of the fine material but leaving, for example, the $-40$ to $+200$ mesh particles in the filter case. Typical linear velocities which may be employed, range from about 0.3 to about 1.0 foot per second. During the blow-back operation, the particles in the case are violently agitated and impart a scouring or abrasive action to the surface of the filter elements. Such action causes removal of the cake on the surface of and the deposits between the filter elements formed during the production cycle. After a short blow-back cycle which may be from 0.1 to 2.0 minutes, the vent through which fines are removed from the system is closed and the production cycle resumed. The length of the blow-back is usually determined by the amount of fines in the vent gas.

My invention will be further understood by reference to the accompanying drawings in which.

Figure 1:
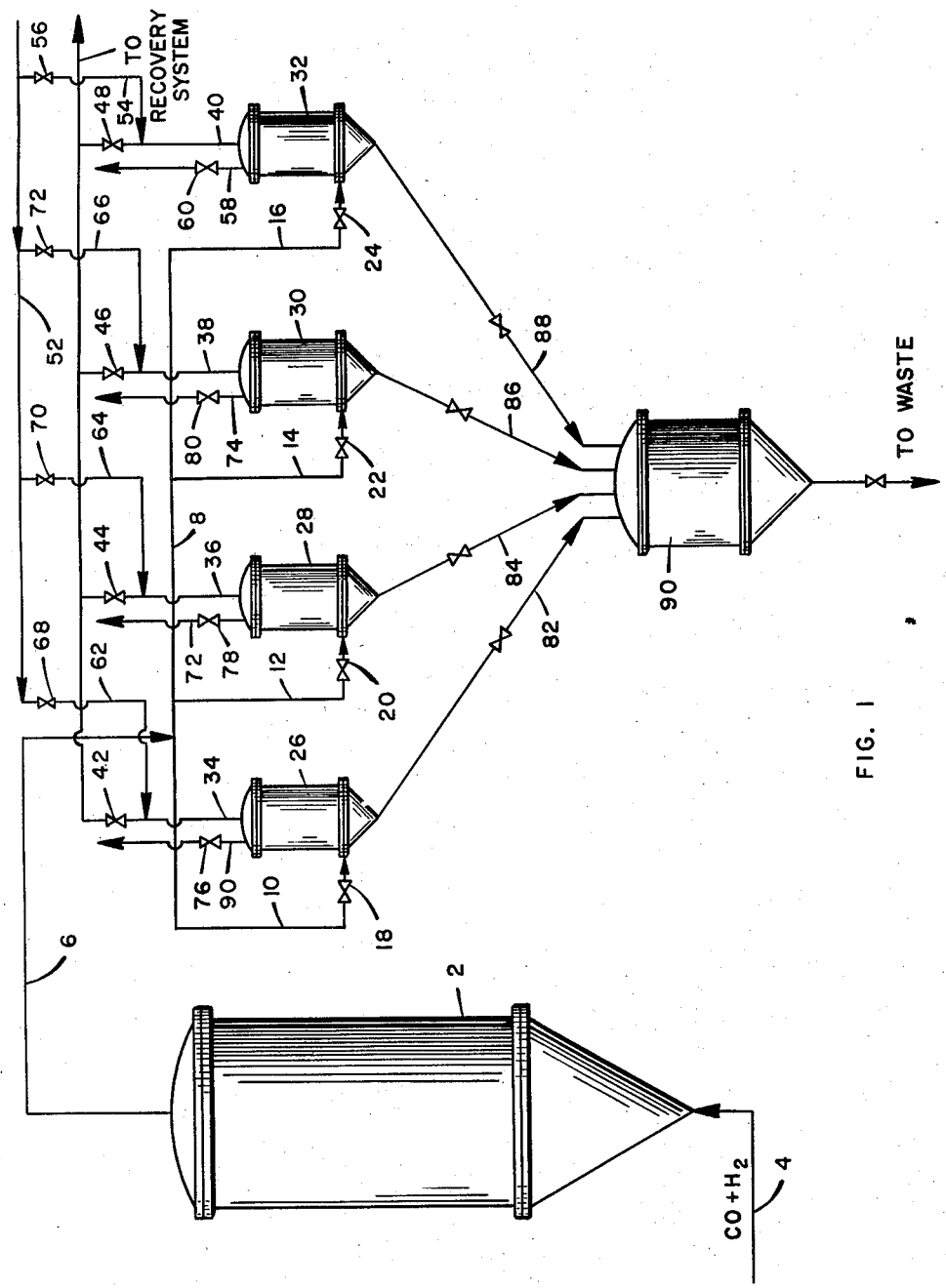
Figure 1 is a diagrammatic representation of a filter assembly used in accordance with my invention, in combination with a hydrocarbon synthesis reactor.

Referring again to Figure 1, which illustrates a reactor and filtration system used in hydrocarbon synthesis, a feed mixture consisting primarily of fresh feed (CO and $H_2$) and recycle gas is introduced into reactor 2 through line 4 at a linear velocity sufficient to maintain the finely divided mill scale catalyst present therein in a fluidized condition. Usually linear velocities of from about .5 to about 1 foot per second are adequate to maintain the catalyst bed fluidized. Other synthesis conditions employed include pressure, 400 p.s.i.; temperature, 600° F.; and recycle ratio, 1.8:1. Product gas rises through the bed and is eventually disengaged therefrom. The product gas containing entrained catalyst particles is then sent through a cyclone separation system, not shown, where further removal of catalyst particles from the gas is effected. The gaseous stream leaving the reactor through line 6, however, still contains extremely finely divided particles, the bulk of which may vary in size from about 1 to 10 microns. This stream then enters manifold 8 connected to lines 10, 12, 14 and 16, equipped with valves 18, 20, 22 and 24 and is evenly distributed to filter case 26, 28, 30 and 32. In these filter cases the remaining fines are removed from the product gas by means of a fluidized bed of coarse, for example, —40 to +200 mesh catalyst and a system of porous metal filters immersed in said bed. The gas from which the fines have thus been removed is then taken through lines 34, 36, 38 and 40, and valves 42, 44, 46 and 48, and introduced into line 50 leading to a suitable products recovery system. During continuous operation individual filter cases are periodically taken off the production cycle and put on blow-back. Need for blow-back is indicated when the pressure drop in a filter case exceeds about 10 p.s.i. Thus, for example, in transferring catalyst case 32 from the production cycle to blow-back, valves 24 and 48 are closed and a suitable gas such as recycle gas, is sent into case 32 at a high linear velocity, for example, 1.0 feet per second via manifold 52, line 54, open valve 56 and line 40. Under these blow-back conditions, catalyst caked on the surface of the filter elements and between them is removed by the scouring action of the coarse particles in case 32. Catalyst fines are removed through vent line 58 and open valve 60. In similar fashion, blow-back is accomplished in cases 26, 28 and 30 by closing valves 18 and 42, 20 and 44, and 22 and 46, and injecting recycle gas through open valves 68, 70 and 72, and lines 62 and 34, 64 and 36, and 66 and 38. As in catalyst case 32, fines are removed from cases 26, 28 and 30 through lines 75, 79 and 74 and open valves 76, 78 and 80, respectively. Periodically and at different intervals coarse catalyst in cases 26, 28, 30 and 32, may be withdrawn through valved lines 82, 84, 86 and 88, and transferred to disposal unit 90. After the cases are refilled with fresh coarse catalyst or other suitable coarse particles, they are ready for further use.

Figure 2:
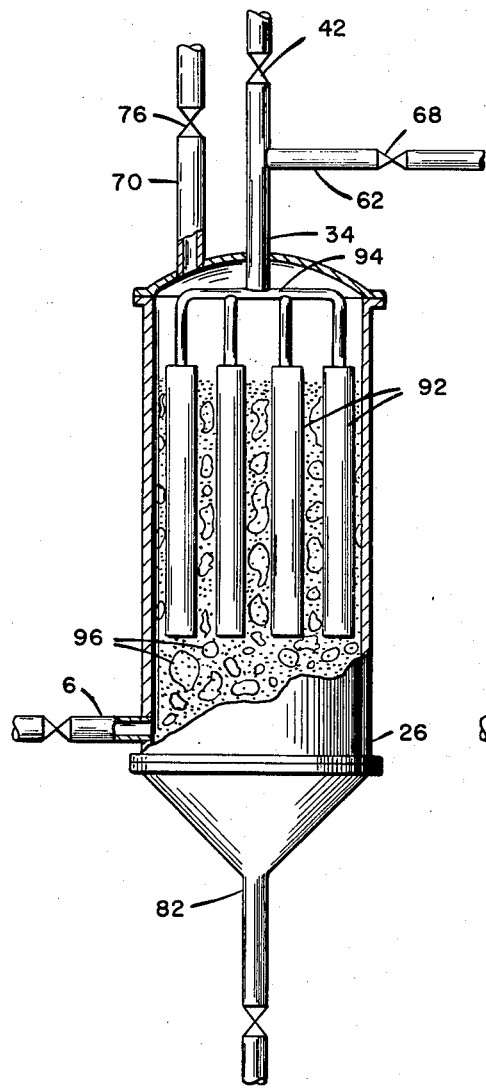
Figure 2 is an elevational view, partly in section, showing in detail an arrangement of filter elements within a filter case, as contemplated by my invention.

Figure 2, which, for example, is a detailed view of filter case 26, shows a cluster of four porous metal filter elements 92 hooked up to manifold or header 94, through which gas flows into line 34. The flow of gas through the bed of coarse catalyst is indicated by bubbles 96. Filter elements 92 may be arranged in a number of geometrical patterns. Any of such patterns which permit the free flow of gas in both directions through the filter elements is satisfactory for my purpose.

Figure 3:
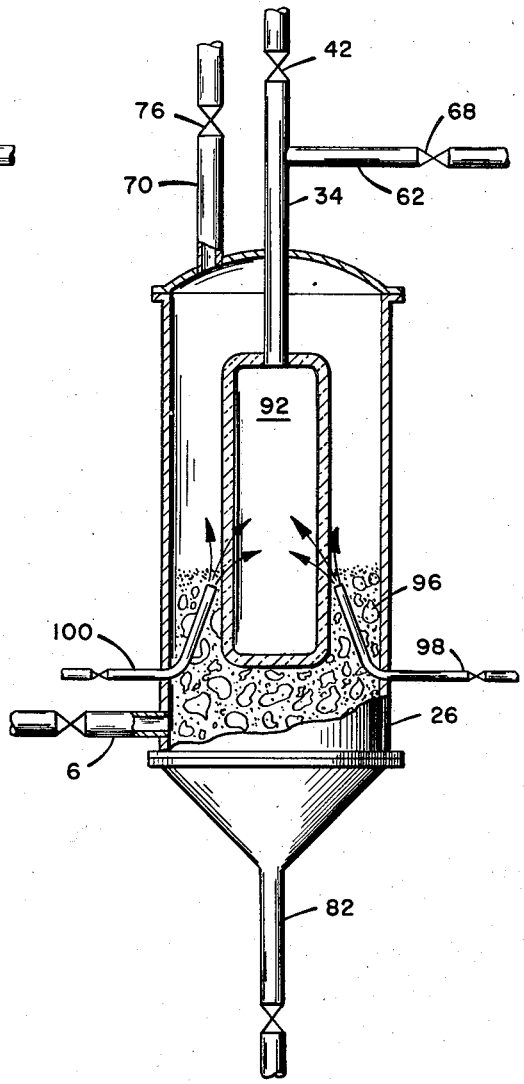
Figure 3 is another elevational view, partly in section, showing still a further embodiment which may be used in practising the invention.

Figure 3 shows still another embodiment of my invention wherein removal of the filter cake from filter element 92 in case 26, is aided by means of valved auxiliary blow-back lines 98 and 100. During blow-back recycle gas from the process is forced through lines 98 and 100, the outer ends of which are bent at an angle such that a stream of gas from each line impinges upon the surface of filter element 92. These gaseous streams, together with coarse catalyst in the shallow fluid bed, assist materially removal of the aforesaid catalyst cake during the blow-back operation.

From the foregoing description, it will be seen that the means by which finely divided particles are removed from gaseous streams, in accordance with my invention, has a number of advantages. Thus, an improved filtering system is provided by which a fluidized bed of coarse particles, catalytic or non-catalytic, is used to accomplish a major portion of the filtering operation thereby lessening the load on the filtering elements themselves. Also, it will be seen that the method which I have taught, constitutes an efficient and effective means for removing filter cake from the filter element surfaces. In addition, the process of my invention is made quite practical by the fact that I provide a method for separating fines from the filter case during blow-back so that the concentration of fines during the production cycle can be maintained at a minimum.

The expression "catalyst fines" or "fines" as used herein, is intended to refer to solids having a particle size sufficiently small to pass into or through the pores of the filter element employed.

I claim:

1. In a process for separating fines from a gaseous stream thereof, the improvement which comprises introducing said stream into a zone containing at least one filter element and a fluidized bed of relatively coarse solid particles different in composition from that of said fines, said particles at least partially encompassing and in direct contact with said filter element whereby a portion of said fines is trapped and held on the surface of said particles, allowing said stream which is now depleted with respect to said fines, to pass through said filter element and continuing this operation until the surface and pores of said element are caked and plugged by a deposit of said fines as evidenced by a substantial pressure drop across said filter element, thereafter reversing the gas flow through said filter element at a velocity such that the fines in said pores become dislodged therefrom and the cake formed on the surface of said element is removed by the scouring or abrasive action of said coarse particles on said surface in said zone, said fines removed from said pores and said surface collecting in an upper portion of said zone, selectively removing said fines from said zone and continuing the reversed flow of gas through said filter element until said fines have been substantially completely removed from said zone leaving said coarse particles therein, thereafter reversing the gas flow so that said stream passes through said zone in the original direction of flow, and repeating the above cycle.

2. The process of claim 1 in which a plurality of filters is employed in each of a plurality of zones.

3. The process of claim 1 in which said gaseous stream is the effluent from a fluidized dense phase process involving the synthesis of hydrocarbons from carbon monoxide and hydrogen by contact with a hydrocarbon synthesis catalyst and said particles and fines are composed of hydrocarbon synthesis catalyst.

4. The process of claim 1 in which said relatively coarse solid particles and said fines are composed of a hydrocarbon cracking catalyst and said stream is the effluent from a catalytic cracking unit.

5. The process of claim 3 in which the gas used on the reverse flow cycle comprises essentially a normally incondensible gas fraction produced in said process.

References Cited in the file of this patent

UNITED STATES PATENTS

| | | |
|---|---|---|
| 2,429,751 | Gohr et al. | Oct. 28, 1947 |
| 2,526,651 | Garbo | Oct. 24, 1950 |
| 2,548,875 | Degnen | Apr. 17, 1951 |